(12) United States Patent
Chen et al.

(10) Patent No.: US 12,547,729 B2
(45) Date of Patent: Feb. 10, 2026

(54) CHECKER AND CHECKING METHOD FOR PROCESSOR CIRCUIT

(71) Applicant: REALTEK SEMICONDUCTOR CORPORATION, Hsinchu (TW)

(72) Inventors: Yean-Ru Chen, Hsinchu (TW); Chih Cheng Ting, Hsinchu (TW); Yu-Ting Huang, Hsinchu (TW); Chia-I Chen, Hsinchu (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 264 days.

(21) Appl. No.: 17/844,671

(22) Filed: Jun. 20, 2022

(65) Prior Publication Data

US 2023/0078985 A1     Mar. 16, 2023

Related U.S. Application Data

(60) Provisional application No. 63/244,271, filed on Sep. 15, 2021.

(30) Foreign Application Priority Data

Dec. 27, 2021   (TW) ................................. 110148982

(51) Int. Cl.
*G06F 21/57*     (2013.01)
*G06F 9/30*      (2018.01)

(52) U.S. Cl.
CPC ........ *G06F 21/577* (2013.01); *G06F 9/30058* (2013.01); *G06F 9/3013* (2013.01)

(58) Field of Classification Search
None
See application file for complete search history.

(56) References Cited

U.S. PATENT DOCUMENTS

| | | | |
|---|---|---|---|
| 2013/0061322 A1* | 3/2013 | Sethumadhavan | G06F 21/00 726/23 |
| 2020/0319889 A1* | 10/2020 | Kalamatianos | G06F 9/3834 |
| 2021/0064541 A1* | 3/2021 | Kothinti Naresh | G06F 12/0862 |
| 2022/0067155 A1* | 3/2022 | Favor | G06F 9/30101 |

OTHER PUBLICATIONS

Paul Kocher et al, Spectre Attacks: Exploiting Speculative Execution Published in conference of: 2019 IEEE Symposium on Security and Privacy Conference data: May 19-23, 2019 Conference location: San Francisco, CA, USA.
Office Action corresponding to Taiwanese application No. TW 110148982 issued on Aug. 10, 2022.

(Continued)

*Primary Examiner* — Benjamin E Lanier
*Assistant Examiner* — Felicia Farrow
(74) *Attorney, Agent, or Firm* — WPAT, P.C.; Anthony King

(57) ABSTRACT

A checking method for a processor circuit includes: determining whether a data cache send a data refill request under a branch prediction executing status for obtaining a first result; determining whether data requested by the data refill request is written into a register and calculated under the branch prediction executing status for obtaining a second result; and determining whether the processor circuit has a vulnerability according to the first result and the second result.

9 Claims, 6 Drawing Sheets

(56) References Cited

OTHER PUBLICATIONS

Brief Translation of Office Action corresponding to Taiwanese application No. TW 110148982 issued on Aug. 10, 2022.
Chinese office action dated Jun. 28, 2025 for counterpart 202111662894.7.
English abstract translation of chinese office action dated Jun. 28, 2025 for counterpart 202111662894.7.

* cited by examiner

CHECKER AND CHECKING METHOD FOR PROCESSOR CIRCUIT

CROSS REFERENCE TO RELATED APPLICATIONS

This application claims priority of Taiwan application No, 110148982 filed on Dec. 27, 2021; U.S. provisional application No. 63/244,271 filed on Sep. 15, 2021, which is incorporated by reference in its entirety.

BACKGROUND

Field of the Invention

The present invention relates generally to checker and checking method, in particular, to checker and checking method for processor circuit.

Description of Related Art

In conventional processor architectures, the out-of-order execution and branch prediction functions are introduced to improve instruction processing performance. However, there are information security vulnerabilities in the processors with out-of-order execution and branch prediction functions, which can be easily attacked by hackers to steal the data. Among them, spectre attack is one of the most common attack modes.

In order to avoid the spectre attack, the existing solutions mainly include: (1) using software solutions to turn off the branch prediction function; or (2) inserting a barrier instruction into the program fragment with information security concerns. However, such solutions will seriously affect the performance of the processor.

BRIEF SUMMARY OF THE INVENTION

Some embodiments of the present invention provide a checking method for use in a processor circuit. The processor circuit includes an out-of-order execution and branch prediction unit. The checking method includes: determining whether a data cache sends a data refill request under a branch prediction execution status for obtaining a first determination result; determining whether a data requested by the data refill request is written into a register and calculated under the branch prediction execution status for obtaining a second determination result; and determining whether the processor circuit has vulnerability according to the first determination result and the second determination result.

Some embodiments of the present invention provide a checker for use in a processor circuit. The processor circuit includes an out-of-order execution and branch prediction unit. The checker includes: a first checking module, a second checking module and a determination module. The first checking module is configured to determine whether a data cache of the processor circuit sends a data refill request under a branch prediction execution status for obtaining a first determination result. The second checking module is configured to determine whether a data requested by the data refill request is written into a register of the processor circuit and calculated under the branch prediction execution status for obtaining a second determination result. The determination module is configured to determining whether the processor circuit has vulnerability according to the first determination result and the second determination result.

BRIEF DESCRIPTION OF THE DRAWINGS

Aspects of the present invention are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Embodiments of the present invention are discussed in detail below. It should be appreciated, however, that the present invention provides many applicable inventive concepts that can be embodied in a wide variety of specific contexts. The specific embodiments discussed are merely illustrative and do not limit the scope of the disclosure.

Figure 1A:
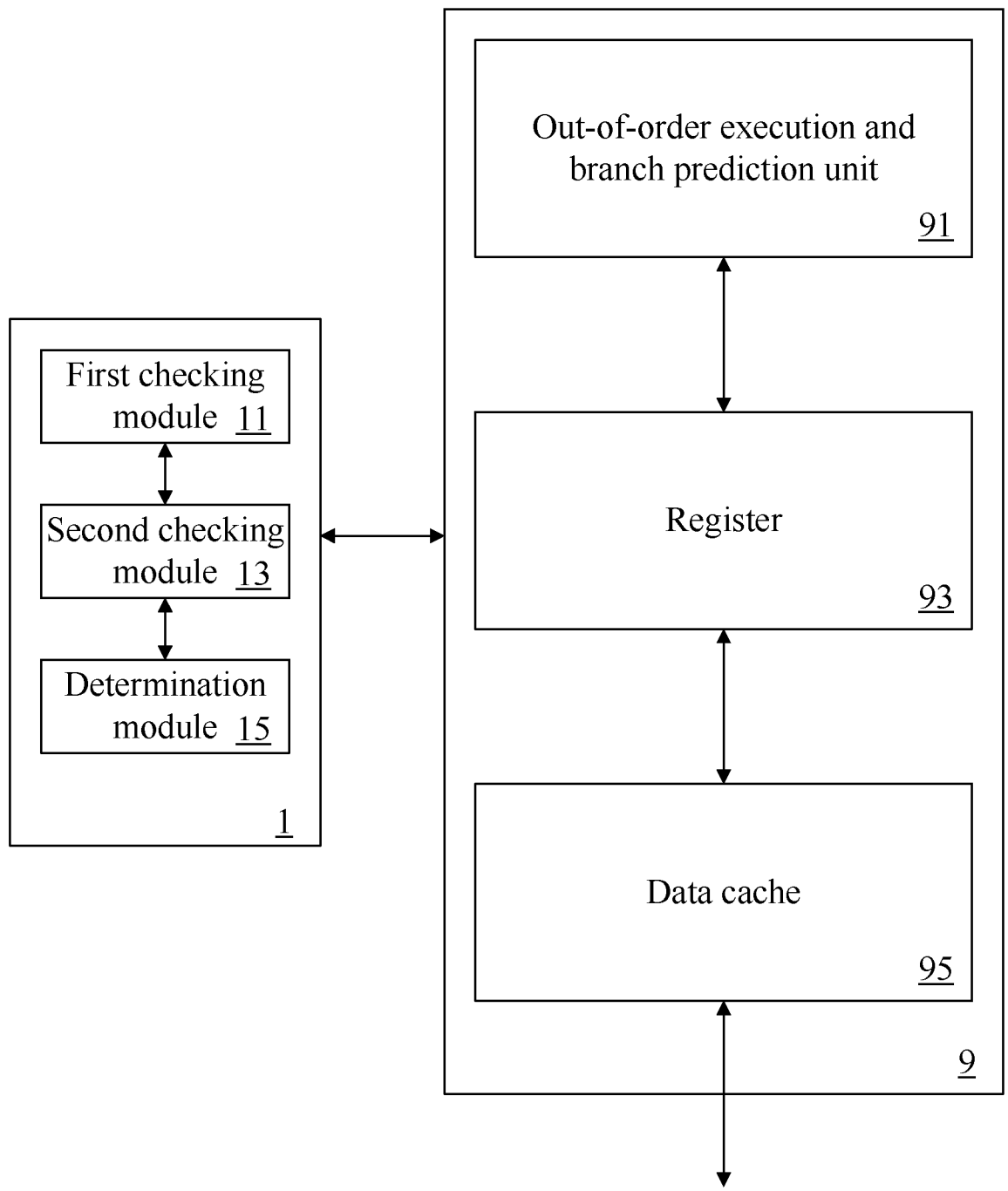
FIG. 1A is a block diagram illustrating a checker according to some embodiments of the present disclosure.

Reference is made to FIG. 1A, which is a block diagram illustrating a checker 1 according to certain embodiments of the present disclosure. The checker 1 is configured to check whether a processor circuit 9 has a vulnerability (such as spectre attack). In certain embodiments, the processor circuit 9 includes an out-of-order execution and branch prediction unit 91, a register 93 and a data cache 95. The out-of-order execution and branch prediction unit 91 is configured to decode instructions and execute the decoded instructions out-of-order. The out-of-order execution and branch prediction unit 91 is capable of branch prediction and can record a branch prediction status, such as: branch prediction execution status (branch prediction unresolved status) and branch prediction non-execution status (branch prediction resolved status).

In certain embodiments, the checker 1 includes a first checking module 11, a second checking module 13 and a determination module 15. Specifically, the first checking module 11 is configured to determine whether the data cache 95 of the processor circuit 9 sends a data refill request under the branch prediction execution status for obtaining a first determination result. The second checking module 13 is configured to determine whether a data requested by the data refill request is written into the register 93 of the processor circuit 9 and calculated under the branch prediction execution status for obtaining a second determination result. The determination module 15 is configured to determining whether the processor circuit 9 has a vulnerability according to the first determination result and the second determination result.

Figure 1B:
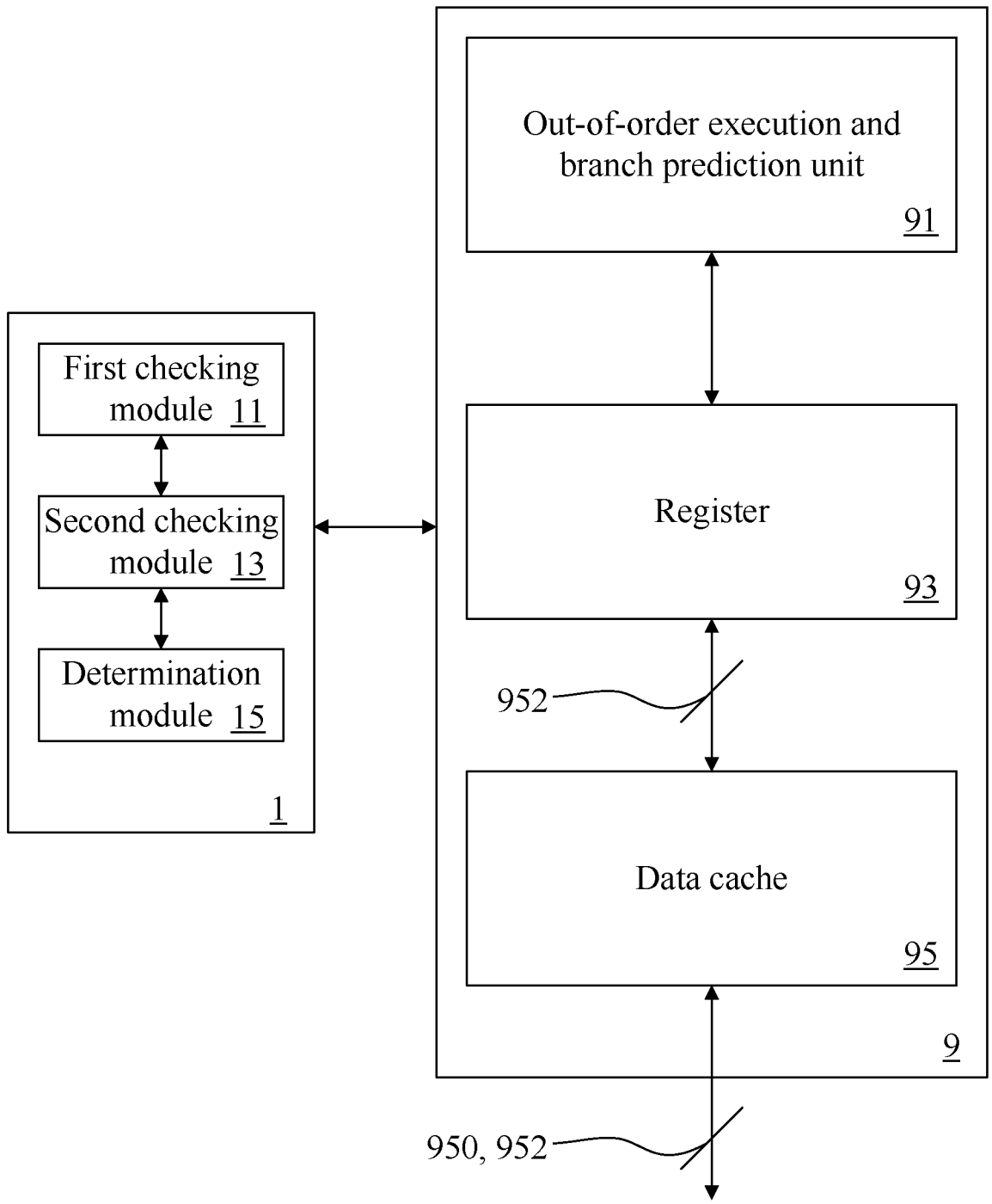
FIG. 1B is a block diagram illustrating a checker according to some embodiments of the present disclosure.

Reference is made to FIG. 1B. In certain embodiments, when the first checking module 11 determines that the data cache 95 of the processor circuit 9 sends a data refill request 950 under the branch prediction execution status, then the second checking module 13 further determines whether the data requested by the data refill request 950 is written into the register 93 of the processor circuit 9 and calculated under the branch prediction execution status. When the second checking module 13 determines that a data. 952 requested by the data refill request 950 is written into the register 93 of the processor circuit 9 and calculated under the branch prediction execution status, then the determination module 15 determines that the processor circuit 9 may have vulnerability according to the above-mentioned checking results of the first checking module 11 and the second checking module 13.

In certain embodiments, when: (1) the first checking module 11 determines that the data cache 95 of the processor circuit 9 does not send any data refill request under the branch prediction execution status; (2) when the second checking module 13 determines that the data 952 requested by the data refill request 950 is not written into the register 93 of the processor circuit 9 under the branch prediction execution status; or (3) when the second checking module 13 determines that the data 952 is not calculated under the branch prediction execution status, then the determination module 15 determines that the processor circuit 9 may not have a vulnerability according to the above-mentioned checking results of the first checking module 11 and the second checking module 13.

It should be noted that, in certain embodiments, the above-mentioned processor circuit and checker can include a hardware circuit, so that data and signals are transmitted via the electrical connection between components of the processor circuit (such as the out-of-order execution and branch prediction unit, the register and the data cache) and components of the checker (the first checking module, the second checking module and the determination module). In certain embodiments, the signal and data transmission between the above-mentioned processor circuit, checker and components can be simulated using a software, such as, Electronic Design Automation (EDA).

Figure 2A:
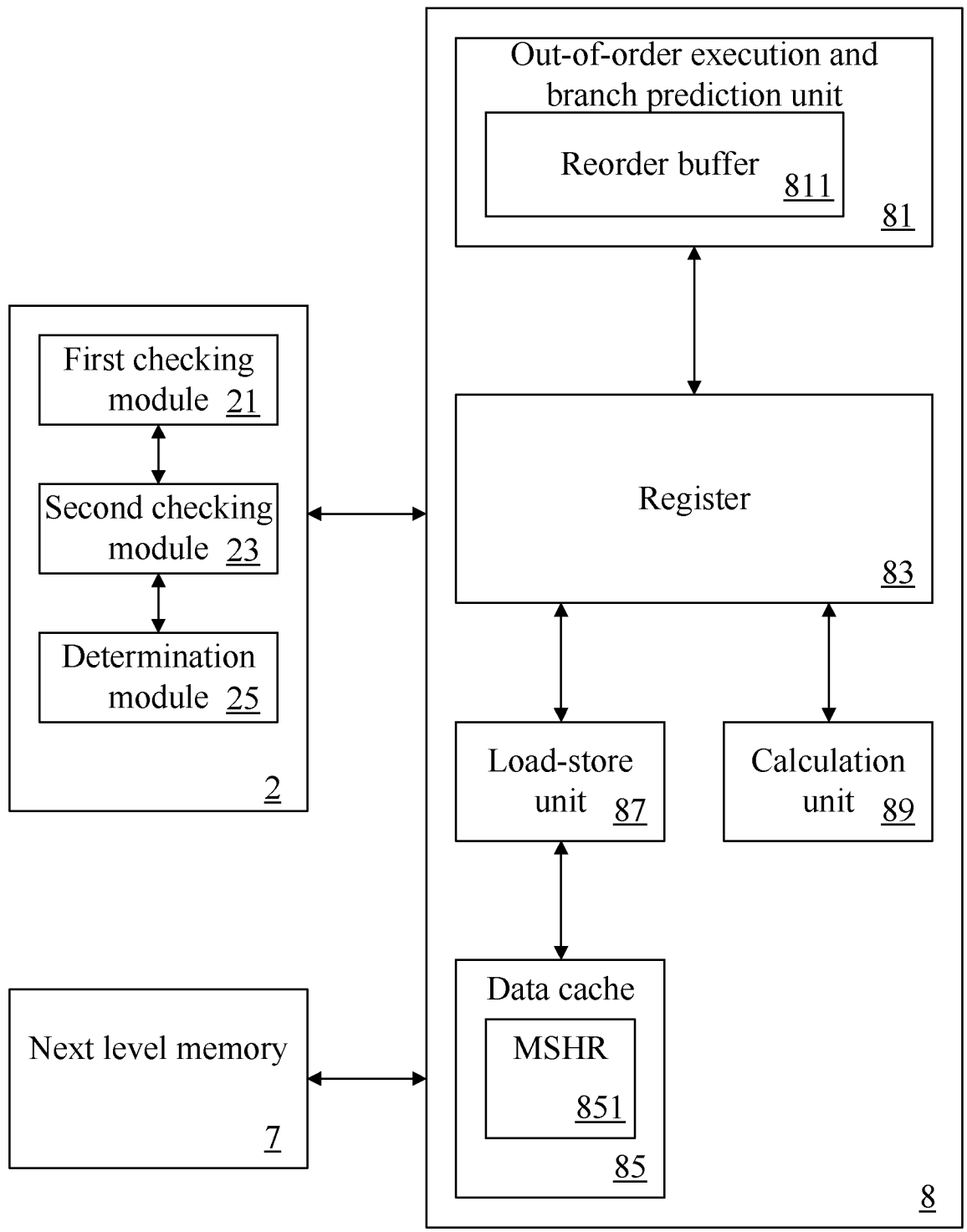
FIG. 2A is a block diagram illustrating a checker according to some embodiments of the present disclosure.
Figure 2B:
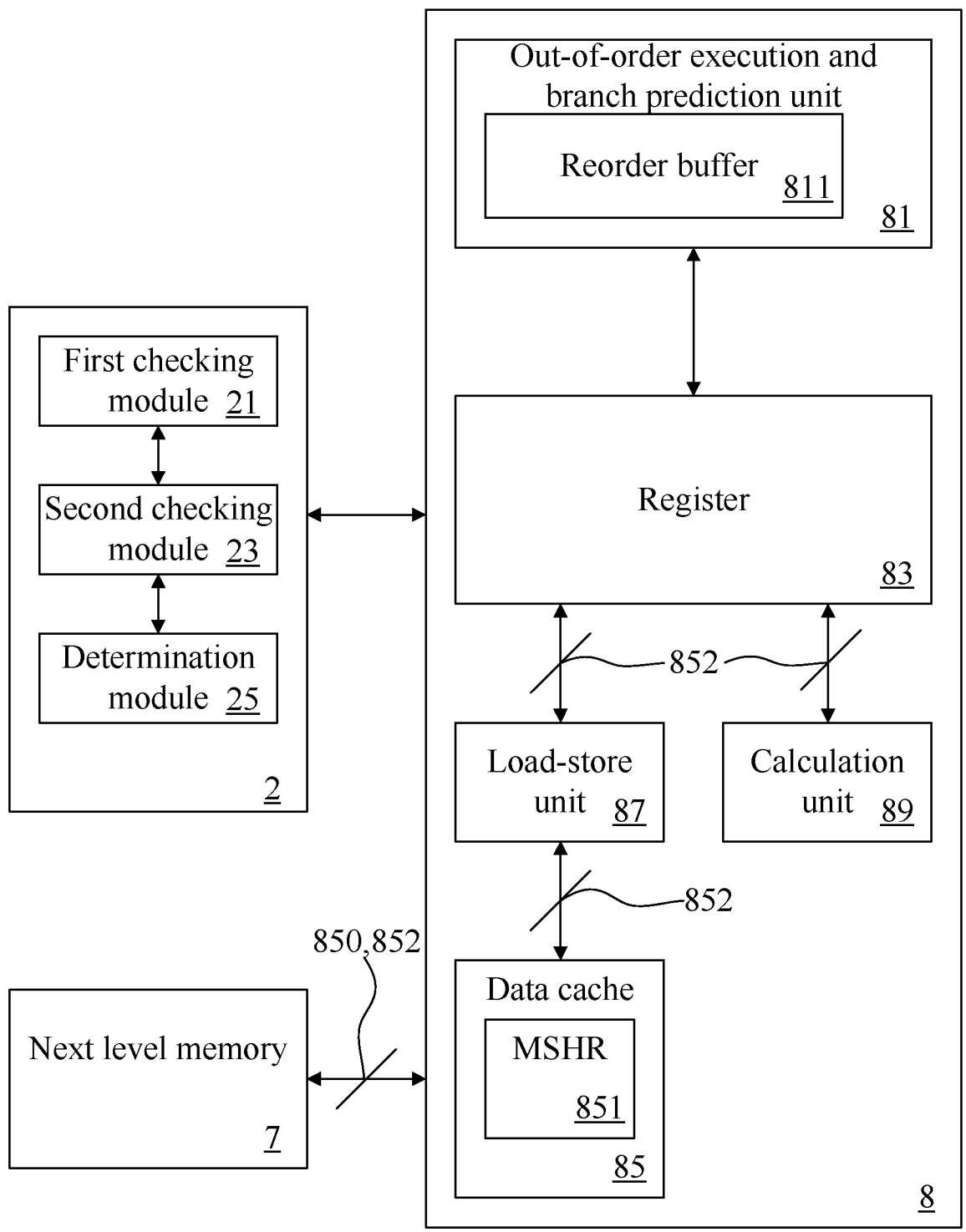
FIG. 2B is a block diagram illustrating a checker according to some embodiments of the present disclosure.

Reference is made to FIG. 2A, which is a block diagram illustrating a checker 2 according to certain embodiments of the present disclosure. The checker 2 is configured to check whether a processor circuit 8 has a vulnerability. In certain embodiments, the processor circuit 8 includes: an out-of-order execution and branch prediction unit 81, a register 83, a data cache 85, a load-store unit 87 and a calculation unit 89. The out-of-order execution and branch prediction unit 81 is configured to decode instructions and execute the decoded instructions out-of-order. The out-of-order execution and branch prediction unit 81 is capable of branch prediction and can record the branch prediction status (such as: the branch prediction execution status and the branch prediction non-execution status) in a reorder buffer 811. The data cache 85 has a miss status holding register (MSHR) 851.

In certain embodiments, the checker 2 includes a first checking module 21, a second checking module 23 and a determination module 25. Specifically, the first checking module 21 is configured to determine whether a cache miss happens in the data cache 85 of the processor circuit 8 under the branch prediction execution status. Because of the cache miss, it is possible that a data refill request is generated. The first checking module 21 is configured to determine whether the MSHR 851 of the data cache 85 sends a data refill request to a next level memory 7 (such as: a second level cache L2 cache, a bus-connected memory, etc.) under the branch prediction execution status for obtaining a first determination result.

The second checking module 23 is configured to determine whether the load-store unit 87 writes a data requested by the data refill request into the register 83 under the branch prediction execution status and determine whether the calculation unit 89 accesses the data of the register 83 under the branch prediction execution status for obtaining a second determination result. The determination module 25 is configured to determining whether the processor circuit 8 has a vulnerability according to the first determination result and the second determination result.

Reference is made to 2B. In certain embodiments, when the first checking module 21 determines that the cache miss happens the data cache 85 of the processor circuit 8 under the branch prediction execution status, and determines that the data cache 85 of the processor circuit 8 sends a data refill request 850 under the branch prediction execution status, then the second checking module 23 further determines whether the data requested by the data refill request 850 is written into the register 83 of the processor circuit 8 and calculated under the branch prediction execution status.

More specifically, when the second checking module 23 determines that the load-store unit 87 writes a data 852 requested by the data refill request 850 from the data cache 85 into the register 83 of the processor circuit 8 under the branch prediction execution status, and determines that the calculation unit 89 accesses the data 852 of the register 83 under the branch prediction execution status, then the determination module 25 determines that the processor circuit 8 may have a vulnerability according to the above-mentioned checking results of the first checking module 21 and the second checking module 23.

In certain embodiments, when: (1) the first checking module 21 determines that the data cache 85 of the processor circuit 8 does not send any data refill request under the branch prediction execution status; (2) when the second checking module 23 determines that the load-store unit 87 does not write the data 852 requested by the data refill request 850 into the register 83 of the processor circuit 8 under the branch prediction execution status; or (3) when the second checking module 23 determines that calculated unit 89 does not access the data 852 under the branch prediction execution status, then the determination module 25 determines that the processor circuit 8 may not have a vulnerability according to the above-mentioned checking results of the first checking module 21 and the second checking module 23.

In certain embodiments, in addition to the reorder buffer 811, the out-of-order execution and branch prediction unit 81 of the processor circuit 8 may further include: an instruction fetch/branch prediction unit, an instruction decode unit and a register renaming/dispatch/retire unit.

It should be noted that, whether the various aforementioned operations are performed in the branch prediction execution status can be determined according to the data of the reorder buffer 851 at the time when the operations are performed. In addition, in certain embodiments, the above-mentioned processor circuit, checker and next level memory can include hardware circuit, so that data and signals are transmitted via the electrical connection between components of the processor circuit (such as the out-of-order execution and branch prediction unit, the register, the data cache, the load-store unit, the calculation unit), components of the checker (the first checking module, the second checking module and the determination module) and the next level memory. In certain embodiments, the signal and data transmission between the above-mentioned processor circuit, checker and components can be simulated using a software, such as, EDA.

Figure 3:
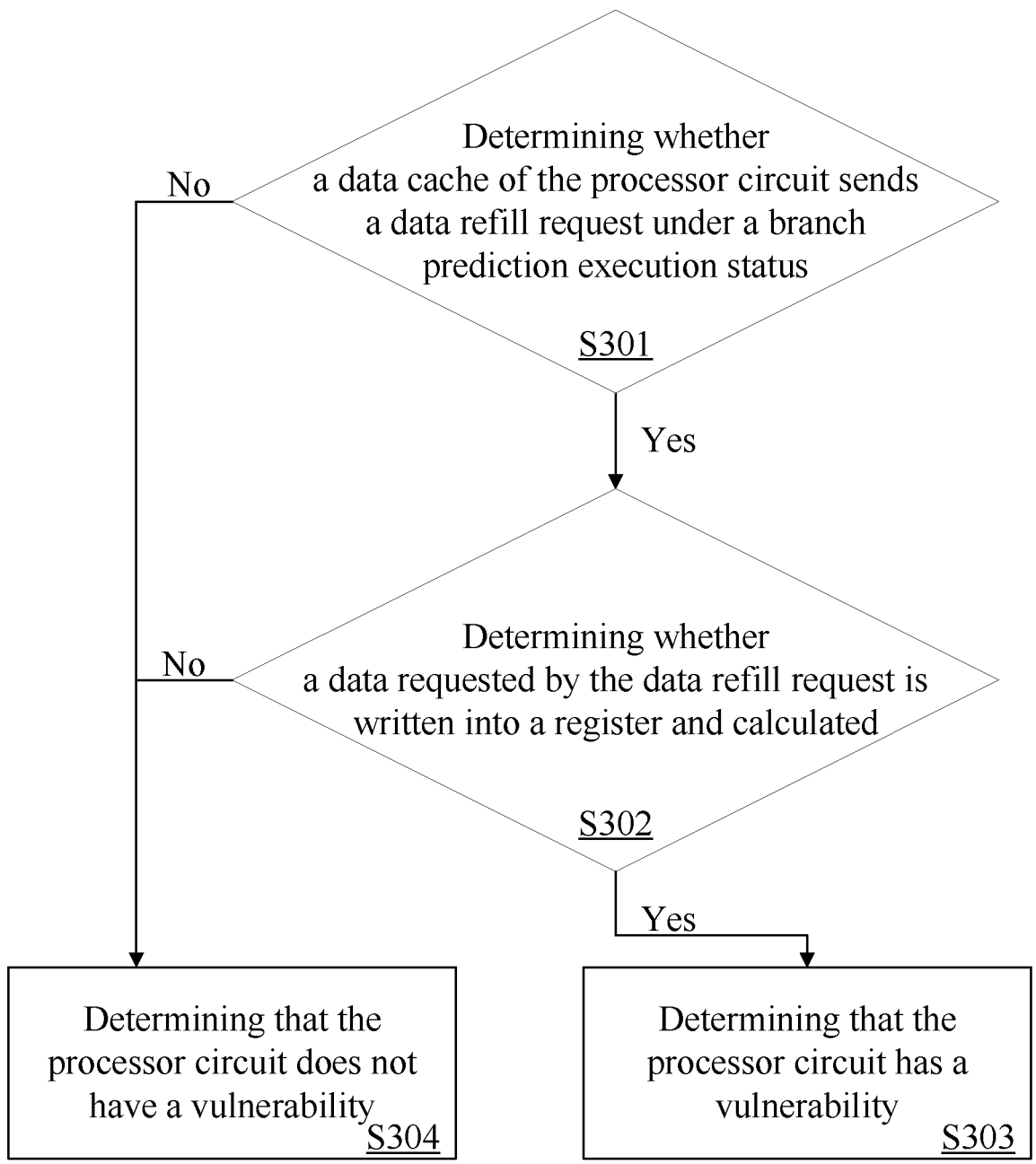
FIG. 3 is a flowchart of a checking method according to some embodiments of the present disclosure.

Certain embodiments of the present disclosure include a checking method for use in a processor circuit, and a flowchart thereof is shown in FIG. 3. The processor circuit includes an out-of-order execution and branch prediction unit. The checking method according to these embodiments is implemented by a checker (such as the checker described in the fore-going embodiments), and detailed operations of the method are discussed below. First, the step S301 is executed to determine whether a data cache of the processor circuit sends a data refill request under a branch prediction execution status for obtaining a first determination result. If the first determination result is negative, then step S304 is executed to determine that the processor circuit does not have a vulnerability. If the first determination result is positive, then step S302 is executed to determine whether a data requested by the data refill request is written into a register and calculated under the branch prediction execution status for obtaining a second determination result. If the second determination result is negative, then the method proceeds to the step S304. If the second determination result is positive, then step S303 is executed to determine that the processor circuit has a vulnerability.

Figure 4:
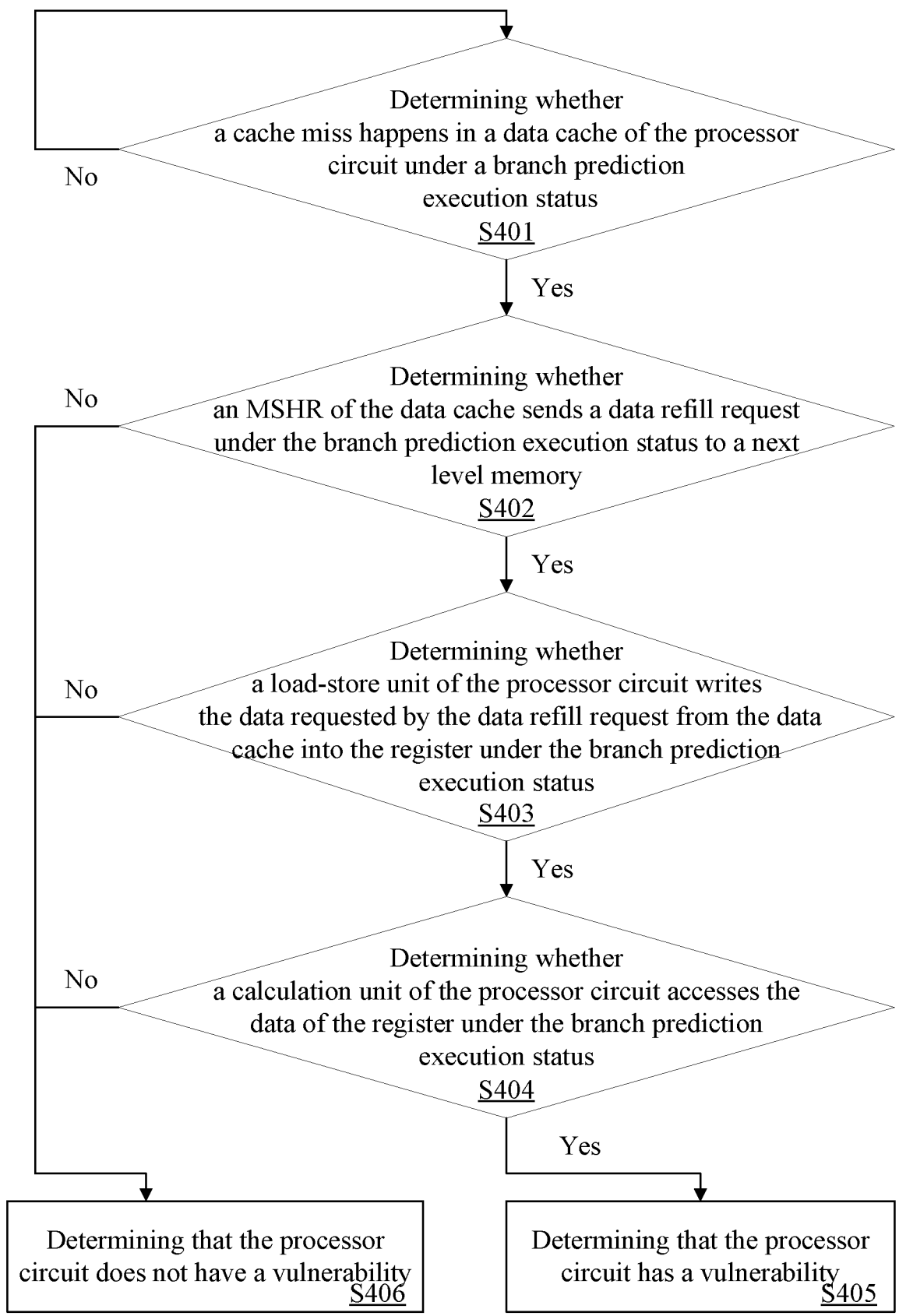
FIG. 4 is a flowchart of a checking method according to some embodiments of the present disclosure.

Certain embodiments of the present disclosure include a checking method for use in a processor circuit, and a flowchart thereof is shown in FIG. 4. The processor circuit includes an out-of-order execution and branch prediction unit. The checking method according to these embodiments is implemented by a checker (such as the checker described in the fore-going embodiments), and detailed operations of the method are discussed below. First, the step S401 is executed to determine whether a cache miss happens in a data cache of the processor circuit under a branch prediction execution status. If not, then the step S401 is repeated.

If the result in the step S401 is positive, then step S402 is executed to determine whether an MSHR of the data cache sends a data refill request under the branch prediction execution status to a next level memory for obtaining a first determination result. If the first determination result is negative, then step S406 is executed to determine that the processor circuit does not have a vulnerability. If the first determination result is positive, then in step S403 is executed to determine whether a load-store unit of the processor circuit writes the data requested by the data refill request from the data cache into the register under the branch prediction execution status. If not, then the step S406 is executed to determine that the processor circuit does not have a vulnerability.

If the result in the step S403 is positive, then step S404 is executed to determine whether a calculation unit of the processor circuit accesses the data of the register under the branch prediction execution status for obtaining a second determination result. If the second determination result is negative, then the step S406 is executed to determine that the processor circuit does not have a vulnerability. If the second determination result is positive, then step S405 is executed to determine that the processor circuit has a vulnerability.

In view of the foregoing, the checkers and checking methods for use in to processor circuits according to embodiments of the present disclosure can use the checking steps to determine whether a specific attack mode of operation (e.g., a spectre attack mode) may exist, so that the processor circuit can be subsequently modified While this invention has been described with specific embodiments thereof, it is evident that many alternatives, modifications, and variations may be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the invention by simply employing the elements of the independent claims. Accordingly, embodiments of the invention as set forth herein are intended to be illustrative, not limiting. Various changes may be made without departing from the spirit and scope of the invention.

What is claimed is:

1. A checking method for checking whether a processor circuit has a vulnerability of spectre attack, the processor circuit comprising an out-of-order execution and branch prediction unit and the checking method comprising:
   determining whether a data cache sends a data refill request under a branch prediction execution status for obtaining a first determination result;
   determining whether a data requested by the data refill request is written into a register and calculated under the branch prediction execution status for obtaining a second determination result; and
   determining whether the processor circuit has the vulnerability of spectre attack according to the first determination result and the second determination result, including:
      when the first determination result indicates that the data cache does not send the data refill request under the branch prediction execution status and when the second determination result indicates that the data requested by the data refill request is not written into the register and calculated under the branch prediction execution status, determining that the processor circuit is free from having the vulnerability of spectre attack,
      when the first determination result indicates that the data cache sends the data refill request under the branch prediction execution status and when the second determination result indicates that the data requested by the data refill request is not written into the register and calculated under the branch prediction execution status, determining that the processor circuit is free from having the vulnerability of spectre attack, and
      when the first determination result indicates that the data cache sends the data refill request under the branch prediction execution status and when the second determination result indicates that the data requested by the data refill request is written into the register and calculated under the branch prediction execution status, determining that the processor circuit has the vulnerability of spectre attack.

2. The checking method of claim 1, further comprising:
   determining a cache miss happens in the data cache under the branch prediction execution status.

3. The checking method of claim 2, wherein the step of determining whether the data cache sends the data refill request under the branch prediction execution status further comprises:
   determining whether a miss status holding register (MSHR) of the data cache sends the data refill request under the branch prediction execution status for obtaining the first determination result.

4. The checking method of claim 3, wherein the step of determining whether the MSHR of the data cache sends the data refill request under the branch prediction execution status further comprises:
    determining whether the MSHR of the data cache sends the data refill request to a next level memory under the branch prediction execution status for obtaining the first determination result.

5. The checking method of claim 4, wherein the next level memory comprises a second level cache (L2 cache) or a bus-connected memory.

6. The checking method of claim 1, wherein the step of determining whether the data requested by the data refill request is written into the register and calculated under the branch prediction execution status further comprises:
    determining whether the data requested by the data refill request is written into the register from the data cache under the branch prediction execution status; and
    determining whether the data of the register is calculated under the branch prediction execution status for obtaining the second determination result.

7. The checking method of claim 6, wherein the step of determining whether the data requested by the data refill request is written into the register from the data cache under the branch prediction execution status further comprises:
    determining whether a load-store unit writes the data requested by the data refill request into the register from the data cache under the branch prediction execution status.

8. The checking method of claim 7, wherein the step of determining whether the data of the register is calculated under the branch prediction execution status further comprises:
    determining whether a calculation unit accesses the data of the register under the branch prediction execution status for obtaining the second determination result.

9. The checking method of claim 1, wherein the branch prediction execution status is recorded in a reorder buffer.

* * * * *